Oct. 23, 1934.  D. R. McCOWN  1,978,025
COFFEE CAN VACUUM ATTACHMENT
Filed March 1, 1933

Inventor
DONALD R McCOWN
By A. B. Bowman
Attorney

Patented Oct. 23, 1934

1,978,025

UNITED STATES PATENT OFFICE 1,978,025

COFFEE CAN VACUUM ATTACHMENT

Donald R. McCown, San Diego, Calif.

Application March 1, 1933, Serial No. 659,042

8 Claims. (Cl. 220—93)

My invention relates to coffee can vacuum attachment, and the objects of my invention are:

First, to provide an attachment of this class which is in the nature of a follower adapted to rest upon the contents of a coffee can so as to exclude air therefrom;

Second, to provide an attachment of this class which includes a means associated with the handle arranged to admit air to the under side of the attachment when withdrawing it from the can, said means remaining operative to seal the attachment unless the handle is engaged;

Third, to provide an attachment of this class so it may be readily and quickly applied to or moved from a can of coffee without spilling the contents thereof;

Fourth, to provide an attachment of this class which may be readily maintained in a sanitary condition; and Fifth, to provide on the whole a novelly constructed coffee can vacuum attachment which is durable, efficient in its action, and which will not readily deteriorate or get out of order.

Figure 1:
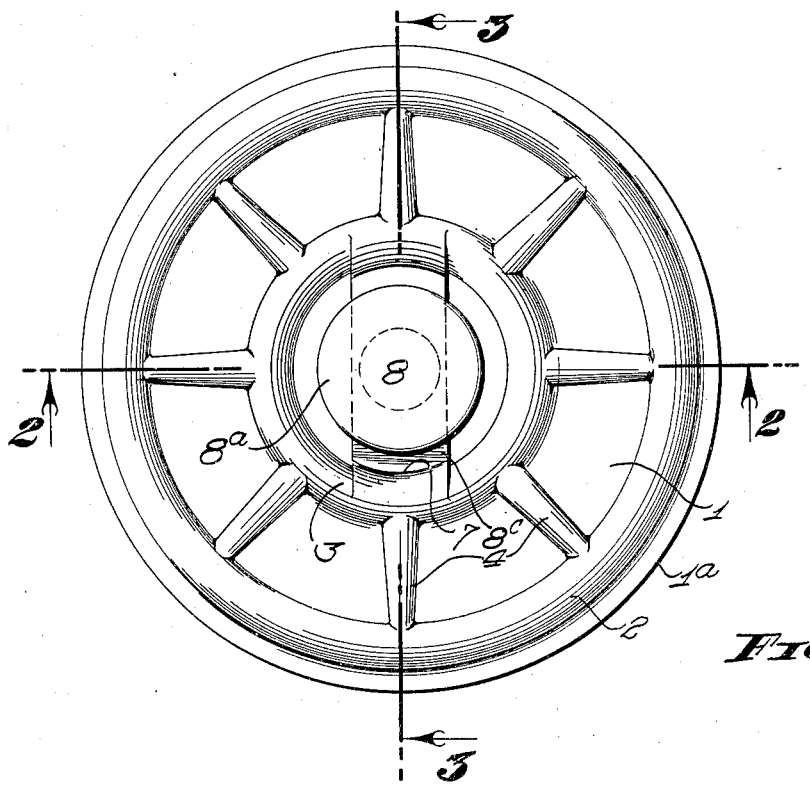
Figure 2:
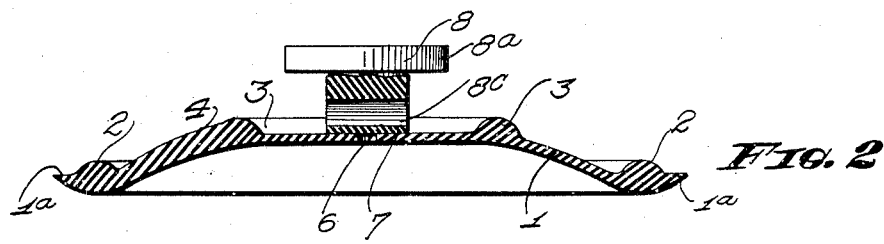
Figure 3:
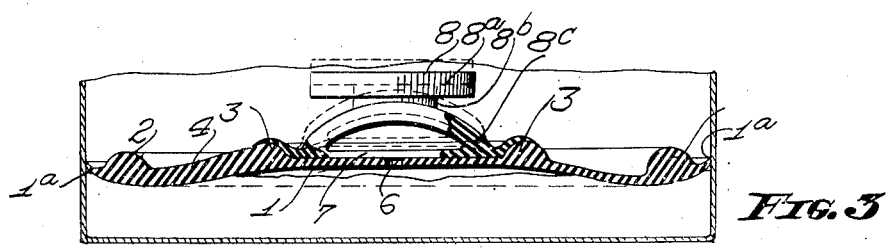

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application, in which:

Figure 1 is a plan view of my coffee can vacuum attachment, Fig. 2 is a sectional view thereof through 2—2 of Fig. 1 with parts and portions shown in elevation, Fig. 3 is a sectional view through 3—3 of Fig. 1, showing the attachment in position in a can, and also showing parts and portions in elevation, and illustrating a dotted line position assumed when with-drawing the attachment from the can.

Similar characters of reference refer to similar parts and portions throughout the several views of the drawing.

My vacuum attachment includes a disc member 1 formed of relatively thin flexible rubber and cast so that its center normally curves upwardly, as shown best in Figs. 2 and 3. The margins of the disc 1 are attennuated or bevelled with the under side sloping upwardly, as indicated by 1a, so that the disc may be readily inserted in a can. The diameter of the disc is slightly greater than the can in which it fits. The marginal portions 1a yieldably engage the walls of the can, as shown in Fig. 3, and conform to the irregularities thereof, thereby forming an effective seal.

A short distance inwardly from the rim or marginal portion 1a there is formed a re-inforcing in the form of a rib 2 disposed on the upper side of the disc. Inwardly from the re-inforcing 2 there is a second annular re-inforcing 3, also in the form of a rib. The two re-inforcing rings 2 and 3 are connected by radially extending ridges 4.

The disc 1 is provided with a centrally disposed valve port 6 therein. Extending diametrically across the port 6 and adhered at its extremities, or made integral with the inner re-inforcing ring 3 is a valve member 7, in the form of a flat strip of rubber. The valve member is stretched slightly so that it normally lays flat against the upper surface of the disc member 1 whether the disc is curved upwardly or downwardly. Secured to or made integral with the valve member 7 is a handle member 8 which comprises a knob 8a connected by a short shank 8b to a pair of arm members 8c which join at their extremities to the valve member 7 inwardly from the connections of the valve member to the inner re-inforcing ring 3. Thus when the knob 8a is drawn upwardly, the valve member is lifted clear of its seat and thereby opens the valve port or opening 6.

Operation of my attachment is as follows: When the attachment is inserted in a can, such as a can of coffee, the marginal portions 1a of the disc flex slightly upwardly and form valve means with the walls of the can as the attachment is forced therein. Likewise the valve member 7 allows escape of air from the valve port 6. When the attachment is forced against the contents of the can, the disc is pressed flat. When the handle is released, the disc tends to assume its normal curvature causing the marginal portion 1a to seal against the walls of the can. The valve member 7 likewise remains closed so that the contents is effectively sealed. When one draws upwardly on the knob or handle 8a, the handle is raised to the dotted line position shown in Fig. 3; thereby raising the valve member 7 away from the valve port 6 so that air may be admitted under the attachment; this enables the attachment to be readily withdrawn from the can.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. A follower attachment for coffee cans comprising, a body element arranged to fit within a coffee can and form a sealed connection with the walls thereof, a valve means carried by said body element and normally co-acting with said body element to seal the coffee can, and a handle connected with said valve means and said body element to open said valve means upon being engaged to remove said body element from the can.

2. A follower attachment for cans comprising, a body element in the form of a disc including a flexible peripheral portion adapted to co-act with the walls of a can, and form therewith a one way valve means allowing the escape of air as the body element is thrust into the can, a second valve means carried by said body element, and a handle associated with said second valve means and said body element to open said second valve means upon being engaged to remove said body element from the can.

3. A follower attachment for receptacles comprising, a flexible body element adapted to form a closure for a receptacle, means associated with said body element arranged to allow the escape of air as the body element is thrust into the receptacle, a handle for withdrawing said body element, and a valve element associated with said handle and body element so as to be opened when said handle is operating to withdraw said body element.

4. A follower attachment for cans comprising, a closure adapted to be inserted in a can including a semi-flexible central portion, and a flexible peripheral portion, the latter portion forming with the walls of a can a one way valve adapted to permit escape of air when said closure is inserted in the can, a handle yieldably connected with said closure, a valve port formed in said closure, a valve member carried by said handle normally closing said valve port, said handle adapted to lift said valve member from said valve seat to permit the introduction of air below said closure when said closure is being withdrawn from the can.

5. A follower attachment for cans comprising, a closure adapted to fit within a can and forming a sliding and sealing connection therewith, a handle yieldably connected with said closure, a valve port formed in said closure, a valve member carried by said handle normally closing said valve port, said handle adapted to lift said valve member from said valve seat to permit the introduction of air below said closure when said closure is being withdrawn from the can.

6. A follower attachment for cans comprising, a closure adapted to fit within a can and forming a sliding and sealing connection therewith, a handle for said closure, a valve means for said closure operatively associated with said handle so as to open when said handle is operated to withdraw said closure, and permit the introduction of air below said enclosure.

7. A follower attachment for receptacles comprising, a flexible body element adapted to form a closure for a receptacle, a handle for withdrawing said body element, and a valve element associated with said handle and body element so as to be opened when said handle is operated to withdraw said body element.

8. A follower attachment for receptacles comprising, a flexible and yieldable body member adapted to form a sliding and sealing connection, the peripheral portion of the body member normally disposed so as to form with the walls of a receptacle a one-way valve means to permit the escape of air as the body member is thrust into the receptacle, said body member being sufficiently flexible to reverse its peripheral portion after an initial outward movement of said body member whereby the peripheral portion again forms a one-way valve means permitting entrance of air into the receptacle as the body member is withdrawn, and valve means in said body member arranged to introduce air thereunder independently of said peripheral portion while withdrawing the body member.

DONALD R. McCOWN.